US011721873B2

(12) United States Patent
Jeong et al.

(10) Patent No.: US 11,721,873 B2
(45) Date of Patent: Aug. 8, 2023

(54) LITHIUM SECONDARY BATTERY SEPARATOR INCLUDING ADHESIVE LAYER

(71) Applicant: LG CHEM, LTD., Seoul (KR)

(72) Inventors: So Mi Jeong, Daejeon (KR); Dong Wook Seong, Daejeon (KR); Dae Sung Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 240 days.

(21) Appl. No.: 16/341,805

(22) PCT Filed: Feb. 13, 2018

(86) PCT No.: PCT/KR2018/001907
§ 371 (c)(1),
(2) Date: Apr. 12, 2019

(87) PCT Pub. No.: WO2018/147741
PCT Pub. Date: Aug. 16, 2018

(65) Prior Publication Data
US 2019/0245183 A1    Aug. 8, 2019

(30) Foreign Application Priority Data

Feb. 13, 2017 (KR) .................. 10-2017-0019606
Feb. 13, 2018 (KR) .................. 10-2018-0018027

(51) Int. Cl.
*H01M 50/426* (2021.01)
*H01M 10/052* (2010.01)
(Continued)

(52) U.S. Cl.
CPC ............ *H01M 50/426* (2021.01); *C09D 7/45* (2018.01); *C09D 7/61* (2018.01); *C09D 7/65* (2018.01);
(Continued)

(58) Field of Classification Search
None
See application file for complete search history.

(56) References Cited

U.S. PATENT DOCUMENTS

2009/0111025 A1* 4/2009 Lee .................. H01M 2/166
429/251
2010/0112432 A1   5/2010 Nishida et al.
(Continued)

FOREIGN PATENT DOCUMENTS

CN   103718336 A   4/2014
CN   103891001 A   6/2014
(Continued)

OTHER PUBLICATIONS

European Search Report issued in European Patent Application No. EP 18 75 1649.7 dated Nov. 13, 2019.
(Continued)

*Primary Examiner* — Amanda C. Walke
(74) *Attorney, Agent, or Firm* — Birch, Stewart, Kolasch & Birch, LLP

(57) ABSTRACT

A coating composition including a solvent, inorganic particles, a dispersant, and a binder, wherein the binder includes a binder B and a binder A, both the binder B and the binder A include a VDF unit and a HFP unit, binder B includes 8 to 50 wt % of the HFP-derived unit, and binder A includes 5 wt % or more of the HFP-derived unit under a condition that a proportion of the HFP-derived unit in the binder A is 80% or less of a proportion of the HFP-derived unit in the binder B, the binder B has a total number average molecular weight of 200,000 to 2,000,000 Da, and the binder A has a total number average molecular weight corresponding to 70% or less of that of the binder B, and a weight ratio of the binder A:the binder B in the coating composition is 0.1 to 10:1. The coating composition is suitable for use in coating (Continued)

at least one surface of a porous substrate having a plurality of pores.

13 Claims, 5 Drawing Sheets

(51) Int. Cl.

| | | |
|---|---|---|
| C09D 7/45 | (2018.01) | |
| C09D 7/61 | (2018.01) | |
| C09D 7/65 | (2018.01) | |
| C09D 127/16 | (2006.01) | |
| H01M 50/44 | (2021.01) | |
| H01M 50/446 | (2021.01) | |
| H01M 50/417 | (2021.01) | |
| H01M 50/42 | (2021.01) | |
| H01M 50/423 | (2021.01) | |
| H01M 50/429 | (2021.01) | |
| H01M 50/454 | (2021.01) | |
| H01M 50/457 | (2021.01) | |
| H01M 50/451 | (2021.01) | |
| H01M 10/0525 | (2010.01) | |

(52) U.S. Cl.
CPC ........ *C09D 127/16* (2013.01); *H01M 10/052* (2013.01); *H01M 50/417* (2021.01); *H01M 50/42* (2021.01); *H01M 50/423* (2021.01); *H01M 50/429* (2021.01); *H01M 50/44* (2021.01); *H01M 50/446* (2021.01); *H01M 50/451* (2021.01); *H01M 50/454* (2021.01); *H01M 50/457* (2021.01); *H01M 10/0525* (2013.01)

(56) References Cited

U.S. PATENT DOCUMENTS

| | | |
|---|---|---|
| 2014/0030578 A1 | 1/2014 | Hoshiba et al. |
| 2014/0120402 A1 | 5/2014 | Yu et al. |
| 2014/0272534 A1 | 9/2014 | Ueki et al. |
| 2014/0308567 A1 | 10/2014 | Nishikawa et al. |
| 2014/0315068 A1 | 10/2014 | Nishikawa et al. |
| 2015/0303003 A1 | 10/2015 | Ha et al. |
| 2016/0190536 A1 | 6/2016 | Park et al. |
| 2016/0190537 A1 | 6/2016 | Park |
| 2017/0338459 A1 | 11/2017 | Nakahiro et al. |
| 2017/0338460 A1 | 11/2017 | Kim et al. |
| 2019/0013504 A1* | 1/2019 | Choi .................. H01M 50/431 |

FOREIGN PATENT DOCUMENTS

| | | |
|---|---|---|
| CN | 105742546 A | 7/2016 |
| CN | 108463904 A | 8/2018 |
| JP | 2008-270178 A | 11/2008 |
| JP | 2013-161707 A | 8/2013 |
| JP | 2014-41818 A | 3/2014 |
| JP | 2014-180821 A | 9/2014 |
| KR | 10-2013-0117360 A | 10/2013 |
| KR | 10-2014-0050877 A | 4/2014 |
| KR | 10-2014-017742 A | 12/2014 |
| KR | 10-2014-0194172 A | 12/2014 |
| KR | 10-2016-0032922 A | 3/2016 |
| KR | 10-2016-0081037 A | 7/2016 |
| KR | 10-2016-0081766 A | 7/2016 |
| KR | 10-2016-0108116 A | 9/2016 |
| KR | 10-2016-0117952 A | 10/2016 |
| WO | WO 2013/058368 A1 | 4/2013 |
| WO | WO 2013/073011 A1 | 5/2013 |
| WO | WO 2016/098684 A1 | 6/2016 |
| WO | WO 2016/175605 A1 | 11/2016 |

OTHER PUBLICATIONS

Indian Office Action dated Feb. 2, 2021 for IN Application No. 201917014061.
International Search Report for PCT/KR2018/001907 (PCT/ISA/210) dated Jun. 27, 2018.
"DolTPoMS—TLP Library Polymer basics—Molecular weight," University of Cambridge, retrieved on Jul. 26, 2021, 3 pages total, URL: https://www.doitpoms.ac.uk/tlplib/polymerbasics/mw.php.
European Communication pursuant to Article 94(3) EPC for European Application No. 18751649.7, dated Jul. 30, 2021.

* cited by examiner

FIG. 1(a) – Conventional Art
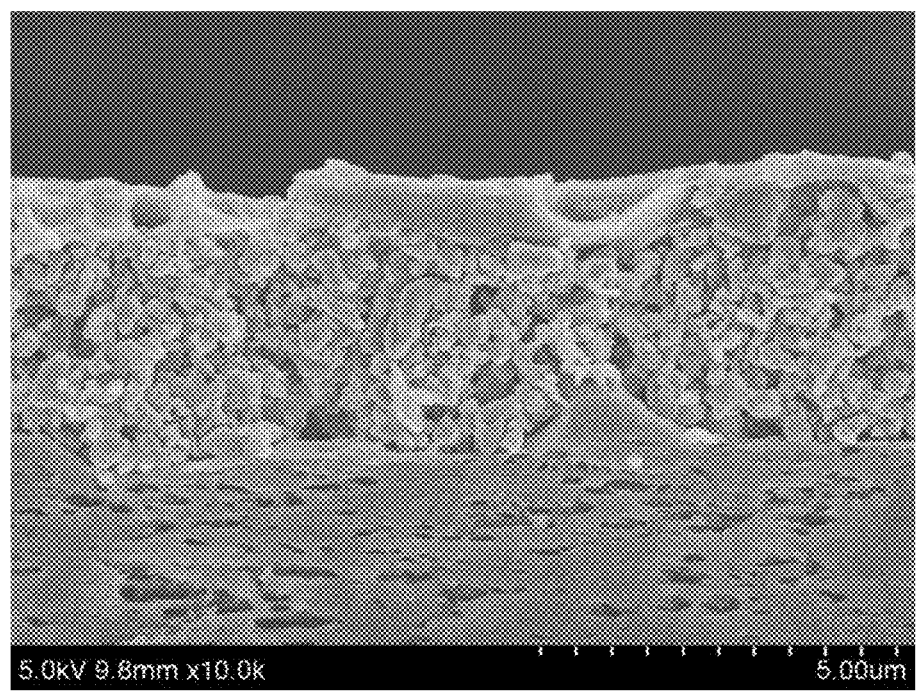

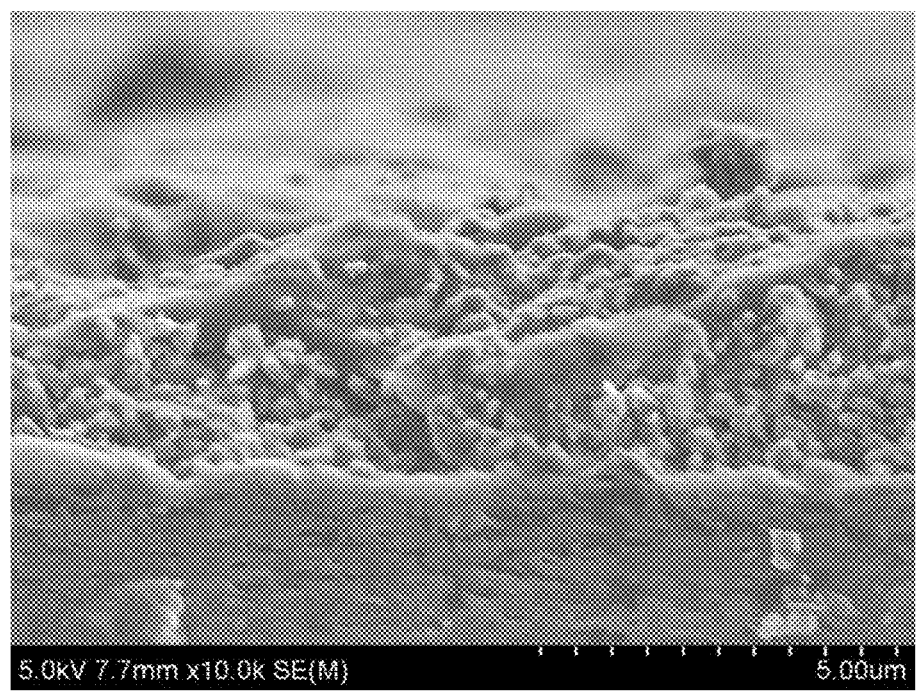
FIG. 1(b) – Conventional Art

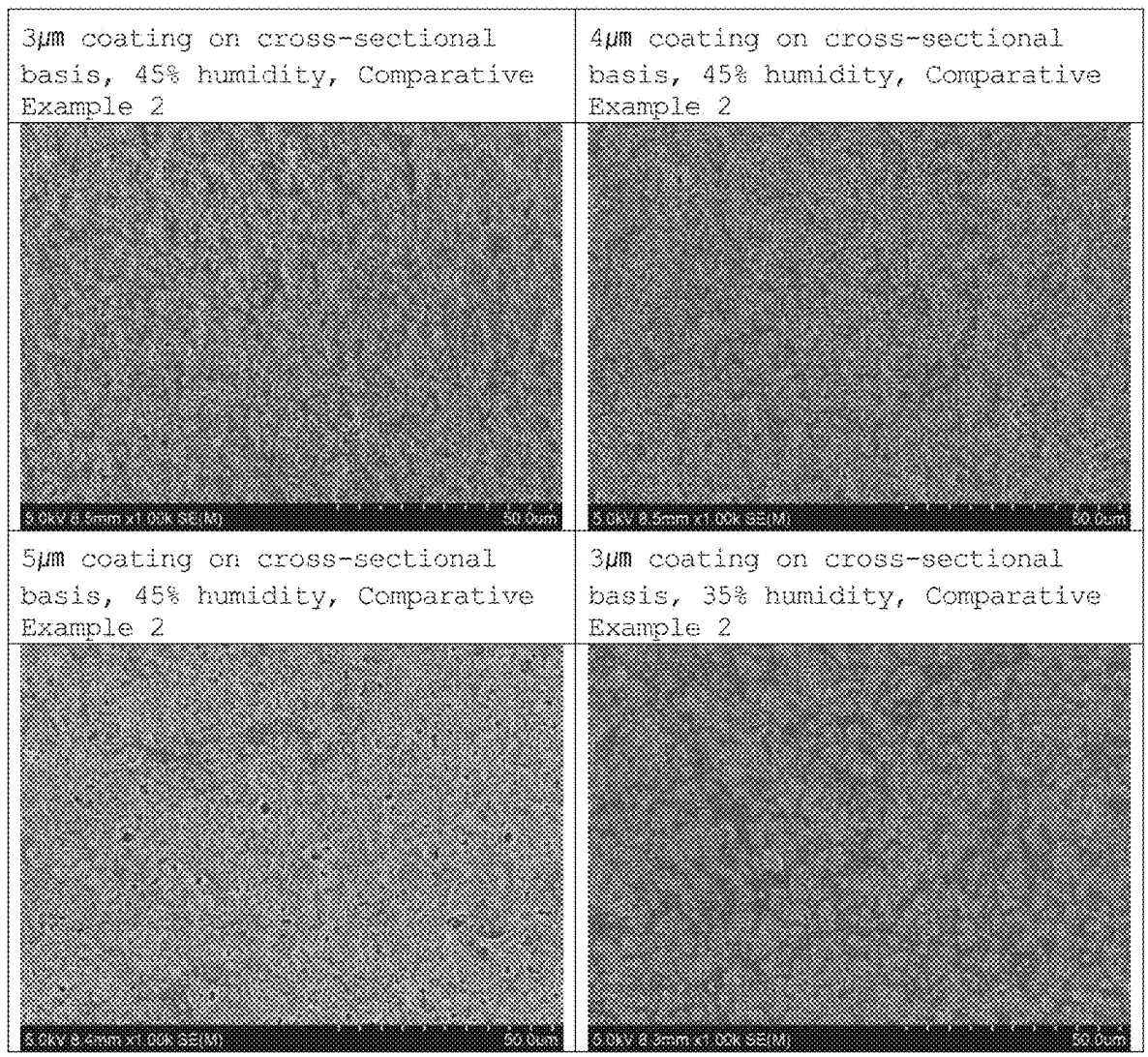

LITHIUM SECONDARY BATTERY SEPARATOR INCLUDING ADHESIVE LAYER

TECHNICAL FIELD

The present invention relates to a coating composition for a lithium secondary battery separator including an adhesive layer, and more particularly to a coating composition for a lithium secondary battery separator including an adhesive layer, suitable for use in coating at least one surface of a porous substrate separator having therein a plurality of pores.

BACKGROUND ART

With the recent trends toward reducing the weight and increasing the functionality of portable devices, such as smartphones, laptop computers, tablet PCs, and portable game machines, the demand for a secondary battery serving as a driving power source thereof is increasing. In the past, nickel-cadmium, nickel-hydrogen, and nickel-zinc batteries have been used, but lithium secondary batteries, which have high operating voltage and high energy density per unit weight, are most frequently used at present.

Lithium secondary batteries are problematic in that there is a risk of explosion due to the generation of heat depending on the use environment. In order to solve the problem of low safety of the lithium secondary battery, technology for increasing the bondability of a separator, especially a porous coating layer of a separator to an electrode, is receiving attention. Stronger bonding between the separator and the electrode may improve the safety of the battery. It is necessary to develop techniques for a binder that suppresses an increase in interfacial resistance of a separator and an electrode due to electrode side-reactions occurring during a cycle and that improves air permeability and for a separator using the binder.

Patent Document 1 discloses a separator including an adhesive layer and a secondary battery using the separator. The secondary battery includes a separator applicable to a secondary battery, and may maintain the shape stability and adhesion of the battery even after charging/discharging under real-world usage conditions of the battery.

Patent Document 1 pertains to a separator, comprising a porous substrate and an adhesive layer formed on one or both surfaces of the substrate, the adhesive layer including a polyvinylidene fluoride (PVDF)-based first binder containing a vinylidene fluoride-derived unit and 5 wt % or less of a hexafluoropropylene (HFP)-derived unit, and a polyvinylidene fluoride (PVDF)-based second binder containing a vinylidene fluoride-derived unit and a hexafluoropropylene (HFP)-derived unit, the amount of the hexafluoropropylene (HFP)-derived unit being 10 to 30 wt %, the weight ratio of the polyvinylidene fluoride (PVDF)-based first binder and the polyvinylidene fluoride (PVDF)-based second binder being 0.5:9.5 to 2:8, and to a secondary battery including the separator.

Patent Document 2 pertains to a separator having a binder layer, an electrochemical device including the separator, and a method of manufacturing the separator. In order to solve the problem of low safety of the secondary battery, bondability M between a separator, especially a porous coating layer of a separator, and an electrode is enhanced. The safety of the battery is increased through strong bonding of the separator and the electrode, and a binder which suppresses an increase in interfacial resistance of the separator and the electrode due to electrode side-reactions occurring during a cycle and improves air permeability is provided.

Patent Document 2 provides a separator, comprising a porous substrate, a porous coating layer and a binder layer, in which the binder present in the porous coating layer and the binder layer contains two or more kinds of polyvinylidene fluoride (PVDF) homopolymer or polyvinylidene fluoride-co-hexafluoropropylene (P(VDF-HFP))-based copolymer, the difference in the amount of the hexafluoropropylene (HFP) being 3 wt % or more. Also, a method of manufacturing the separator is provided, the method including forming a binder solution, forming a slurry, and forming a porous coating layer, in which the binder of the binder solution contains two or more kinds of PVDF homopolymer or P(VDF-HFP)-based copolymer, the difference in the amount of HFP being 3 wt % or more.

Patent Document 3 pertains to a battery cell including a separator having enhanced adhesion, and to a separator, in which even when an organic-inorganic porous coating layer is thinly applied on a porous polymer substrate, high adhesion thereof to the electrode may be exhibited, and the thermal shrinkage ratio of the separator may be improved.

Patent Document 3 pertains to a battery cell configured such that an electrode assembly comprising a cathode, an anode and a separator interposed between the cathode and the anode is embedded in a battery case, in which the separator includes a porous polymer substrate and an organic-inorganic porous coating layer formed on at least one surface of the porous polymer substrate, in which the organic-inorganic porous coating layer includes inorganic particles, containing a mixture of metal oxide and metal hydroxide, and a mixture of a PVDF-HFP polymer binder ('PHFP high') having high hexafluoropropylene (HFP) content and a PVDF HFP polymer binder ('PHFP low') having low HFP content, and in which the adhesion of the separator to the cathode or anode is 15 gf/25 mm or more.

Patent Document 4 pertains to an electrode having enhanced adhesion and a lithium secondary battery including the same, and also provides a method of increasing the cohesion of an electrode current collector and an electrode binder layer and reducing the amount of a binder contained in the electrode binder layer.

In Patent Document 4, the electrode is configured such that the electrode binder containing an electrode active material is applied on the electrode current collector, and the electrode binder contains a mixture of two or more binders having different specific gravities.

Currently, however, a reduction in the thickness of the secondary battery separator is still required, and in recent years, attempts have been made to thin the binder layer of the separator to 3 µm or less (on a cross-sectional basis). Typically, the binder layer of a lithium secondary battery separator is formed in a manner in which a slurry containing a solvent, a binder, a dispersant, and inorganic particles is applied under humidification to thus induce phase separation such that the binder is mainly distributed at the surface of the separator. This process is very sensitive to humidity, and various changes may occur to the type of phase separation depending on the humidity. In some cases, the adhesive layer cannot be sufficiently applied on the surface of the separator.

Furthermore, when drying is performed before phase separation sufficiently occurs, an adhesive layer cannot be formed on the surface of the separator, and sufficient adhesion cannot be realized. In the case where phase separation is temporarily induced or a binder having a very high phase separation rate is used, the adhesion between the porous substrate and the coating layer and the cohesion between the inorganic particles may deteriorate.

In particular, when the thickness of the coating layer is reduced from 4 μm or more to 3 μm, the binder is dried before sufficient phase separation, making it impossible to obtain sufficient electrode adhesion. In the conventional art, upon coating to a thickness of 4 μm or more on a cross-sectional basis (FIG. 1(a)), the adhesive layer is separated and thus positioned at the surface of the separator, but upon thin-film coating to 3 μm or less (FIG. 1(b)), the adhesive layer is not separated, and thus sufficient adhesion thereof to the electrode is not realized (FIG. 1). Even in the conventional art, two or more binders having different PVDF/HPF ratios may be used, as in the present invention, but desired electrode adhesion cannot be attained through sufficient phase separation, both in a humidity environment and upon thin-film coating to 3 μm.

(Patent Document 0001) Korean Patent Application Publication No. 10-2016-0117962

(Patent Document 0002) Korean Patent Application Publication No. 10-2014-0050877

(Patent Document 0003) Korean Patent Application Publication No. 10-2016-0108116

(Patent Document 0004) Korean Patent Application Publication No. 10-2013-0117350

DISCLOSURE

Technical Problem

Accordingly, the present invention is intended to provide a coating composition for a separator, which is capable of enhancing the bondability of the porous coating layer of a separator to an electrode. Specifically, the present invention is intended to provide a coating composition for a separator, including a binder that increases battery safety through strong bonding of a separator and an electrode, suppresses an increase in interfacial resistance of a separator and an electrode due to electrode side-reactions occurring during a cycle, and improves air permeability. In particular, when the thickness of the coating layer of the separator is reduced from 4 μm to 3 μm (on a cross-sectional basis), the coating composition of the invention is able to solve problems in which sufficient electrode adhesion cannot be obtained due to drying of the binder before sufficient phase separation, and enables sufficient phase separation even at low humidity of the manufacturing method.

Technical Solution

Therefore, the present invention provides a coating composition suitable for use in coating at least one surface of a porous substrate having a plurality of pores, the coating composition comprising a solvent, inorganic particles, a dispersant, and a binder, wherein the binder includes a binder B and a binder A, both the binder B and the binder A include a vinylidene fluoride (VDF)-derived unit and a hexafluoropropylene (HFP)-derived unit, binder B includes 8 to 50 wt % of the HFP-derived unit and binder A includes 5 wt % or more of the HFP-derived unit under the condition that a proportion of the REP-derived unit in the binder A is 80% or less of a proportion of the HFP-derived unit in the binder B, the binder B has a total number average molecular weight of 200,000 to 2,000,000 Da, and the binder A has a total number average molecular weight corresponding to 70% or less of that of the binder B, and a weight ratio of the binder A:the binder B in the coating composition is 0.1 to 10:1.

The binder B and the binder A may be composed of vinylidene fluoride (VDF) and hexafluoropropylene (HFP).

The coating composition may further comprise an additional binder, in addition to the binder B and the binder A, the additional binder including any one or a mixture of two or more selected from the group consisting of a vinylidene fluoride-derived copolymer, including poly(vinylidene fluoride-co-chlorotrifluoroethylene) and poly(vinylidene fluoride-co-trifluoroethylene), polymethyl methacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, an acrylonitrile-styrene-butadiene copolymer, and polyimide.

The porous substrate may be a polymer film, a multilayer film thereof, a woven fabric, or a nonwoven fabric, which is formed of any one or a mixture of two or more selected from the group consisting of polyethylene, polypropylene, polyethylene terephthalate, polybutylene terephthalate, polyester, polyacetal, polyamide, polycarbonate, polyimide, polyetheretherketone, polyaryletherketone, polyetherimide, polyamideimide, polybenzimidazole, polyethersulfone, polyphenylene oxide, a cyclic olefin copolymer, polyphenylene sulfide, and polyethylene naphthalene.

The dispersant may be any one or a mixture of two or more acrylic copolymer, and the inorganic particles may be selected from the group consisting of inorganic particles having a dielectric constant of 5 or more, inorganic particles having lithium ion transfer capacity, and a mixture thereof.

The inorganic particles may be composed of at least two kinds of inorganic particles having different sizes. For example, the inorganic particles may include inorganic particles A having D50 of 200 nm to 1 μm and inorganic particles B having D50 corresponding to 70% or less of the D50 of the inorganic particles A.

The binder may be present in an amount of 3 to 50 parts by weight based on 100 parts by weight of the inorganic particles, and the dispersant may be present in an amount of 0.5 to 5 parts by weight based on 100 parts by weight of the inorganic particles.

In addition, the present invention provides a separator, comprising a coating layer formed through coating with the above coating composition. Here, the coating layer may have a thickness of 3 μm or less on a cross-sectional basis.

In addition, the present invention provides an electrochemical device, comprising a cathode, an anode, and the above separator interposed between the cathode and the anode, and preferably provides a lithium secondary battery.

In addition, the present invention provides a method of manufacturing a separator, comprising coating at least one surface of a porous substrate having a plurality of pores with the above coating composition under conditions of a humidity ranging from 35 to 45% and a coating thickness of 3 μm or less.

DESCRIPTION OF DRAWINGS

FIG. 1 shows electron microscope images of phenomena occurring upon coating to a thickness of 4 μm or more (a) and thin-film coating to a thickness of 3 μm or less (b) according to the conventional art;

FIG. 4 shows electron microscope images of Comparative Example 2 according to the present invention.

BEST MODE

Figure 2:
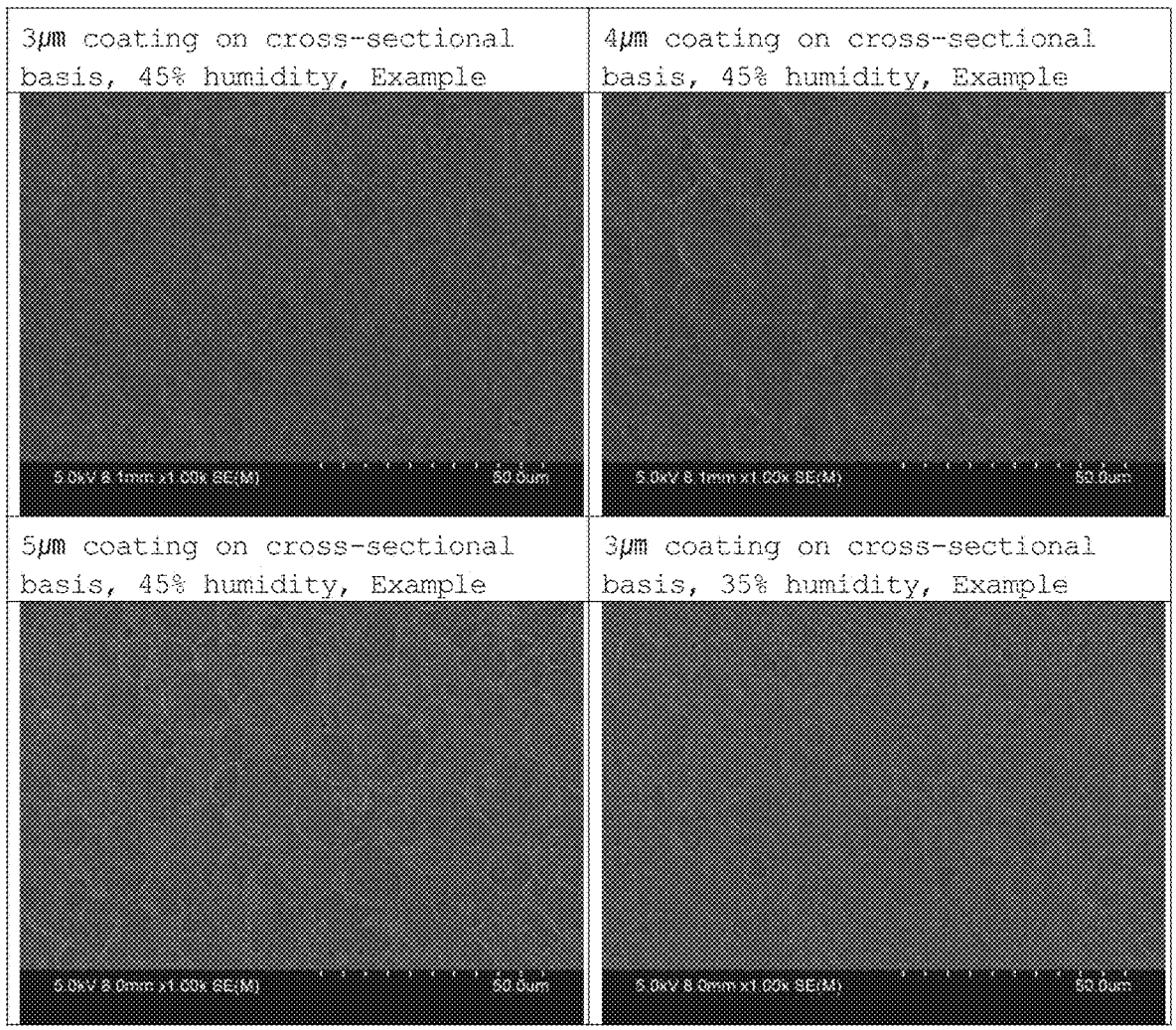
FIG. 2 shows electron microscope images of Example according to the present invention.

Hereinafter, a detailed description will be given of the present invention. Prior thereto, it must be understood that the terms or words used in the description and the claims of the present invention are not to be construed limitedly as having typical or dictionary meanings, but should be interpreted as having the meanings and concepts of the invention in keeping with the scope of the invention based on the principle that the inventors can appropriately define the terms in order to describe the invention in the best way. Therefore, the examples described in the present specification are merely preferred embodiments of the present invention, and do not represent all of the technical ideas of the present invention, and thus it is to be understood that a variety of equivalents and modifications able to substitute therefor may be provided at the point of time at which the present invention is filed.

The present invention addresses a coating composition comprising a solvent, inorganic particles, a dispersant and a binder, suitable for use in coating at least one surface of a porous substrate having a plurality of pores.

1) Porous Substrate

The porous substrate may include, but is not limited to, a polymer film, a multilayer film thereof, a woven fabric, or a nonwoven fabric, which is formed of any one or a mixture of two or more selected from the group consisting of polyethylene, polypropylene, polyethylene terephthalate, polybutylene terephthalate, polyester, polyacetal, polyamide, polycarbonate, polyimide, polyetheretherketone, polyaryletherketone, polyetherimide, polyamideimide, polybenzimidazole, polyethersulfone, polyphenylene oxide, a cyclic olefin copolymer, polyphenylene sulfide, and polyethylene naphthalene.

The thickness of the porous substrate is not particularly limited, but may fall in the range of about 5 to about 50 μm, and the pore size and porosity of the pores in the porous substrate are also not particularly limited, but may range from about 0.01 to about 50 μm and from about 10% to about 95%, respectively.

2) Solvent

As the solvent, preferably useful is a solvent having a low boiling point and solubility similar to that of the binder to be used. This enables mixing to be made uniform and the solvent to be easily removed in subsequent procedures. In particular, a polar solvent having a boiling point of less than 100° C. is used. However, a non-polar solvent is not desirable, because use of the same entails a concern about decreased dispersibility.

Non-limiting examples of the solvent may include any one or a mixture of two or more selected from the group consisting of acetone, tetrahydrofuran, methylene chloride, chloroform, dimethylformamide, N-methyl-2-pyrrolidone (NMP), cyclohexane, and water.

The solvent is used in an amount of about 50 to about 90 parts by weight based on a total of 100 parts by weight of solid and solvent, that is, a total of 100 parts by weight of a solid mixture comprising inorganic material, binder and dispersant and a solvent (e.g. a polar solvent). If the amount of the solvent is less than 50 parts by weight based on the total of 100 parts by weight of the solid and solvent, coating properties are deteriorated due to the high viscosity, great difficulty in forming the binder layer occurs, and it is difficult to form a thin film. On the other hand, if the amount thereof exceeds 90 parts by weight, low productivity and high manufacturing costs may result.

3) Inorganic Particles

The inorganic particles are not particularly limited, so long as they are electrochemically stable. In the present invention, the inorganic particles are not particularly limited, so long as they do not cause oxidation and/or reduction reactions in the operating voltage range (e.g. 0 to about 5 V based on Li/Li+) of an electrochemical device. In particular, when inorganic particles having ion transfer capacity are used, the ion conductivity of the electrochemical device may be increased, thus realizing high performance.

Also, when inorganic particles having a high dielectric constant are used, they may contribute to increasing the dissociation of an electrolyte salt in a liquid electrolyte, for example, a lithium salt, thus improving the ion conductivity of an electrolyte solution.

Hence, the inorganic particles may include inorganic particles having a high dielectric constant of about 5 or more, for example, about 10 or more, inorganic particles having lithium ion transfer capacity, or mixtures thereof. Non-limiting examples of the inorganic particles having a high dielectric constant of about 5 or more may include $BaTiO_3$, $Pb(Zr,Ti)O_3$ (PZT), $Pb_{1-x}La_xZr_{1-y}Ti_yO_3$ (PLZT), $PB(Mg_{3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC, $Al(OH)_3$, and mixtures thereof.

The inorganic particles having lithium ion transfer capacity are inorganic particles in which a lithium element is contained but is not stored, and which have the ability to move lithium ions. Since the inorganic particles having lithium ion transfer capacity may transfer and move lithium ions due to a kind of defect existing in the particle structure, the lithium ion conductivity in the battery is improved and the battery performance may be improved thereby. Non-limiting examples of the inorganic particles having lithium ion transfer capacity may include $(LiAlTiP)_xO_y$-based glass ($0<x<4$, $0<y<13$) such as lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$) and $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$) such as $Li_{3.25}Ge_{0.25}P_{0.75}S_4$, lithium nitride ($Li_xN_y$, $0<x<4$, $0<y<2$) such as $Li_3N$, $SiS_2$-based glass ($Li_xSi_yS_z$, $0<x<3$, $0<y<2$, $0<z<4$) such as $Li_3PO_4$—$Li_2S$—$SiS_2$, $P_2S_5$-based glass ($Li_xP_yS_z$, $0<x<3$, $0<y<3$, $0<z<7$) such as $LiI$—$Li_2S$—$P_2S_5$, and mixtures thereof.

The size of the inorganic particles is not limited but may fall in the range of about 0.01 to about 10 μm, or about 0.05 to about 1.0 μm, in order to form a coating layer having a uniform thickness and to achieve appropriate porosity. When the size of the inorganic particles falls within the above range, it is easy to control the properties of the separator due to the improvement in the dispersibility, and also, problems in which mechanical properties may deteriorate due to an increase in the thickness of the porous coating layer or internal shorting may occur upon charging/discharging of the battery due to the excessively large pore size may be prevented. Also, the inorganic particles may be composed of two or more kinds of inorganic particles having different sizes. For example, the inorganic particles may be composed of inorganic particles A having D50 of 200 nm to 1 μm and inorganic particles B having D50 corresponding to 70% or less of the D50 of the inorganic particles A.

4) Dispersant

The dispersant may be any one or a mixture of two or more selected from the group consisting of an acrylic copolymer. The dispersant exhibits a function as a superior dispersant that improves the dispersibility of an inorganic material. Furthermore, the dispersant has a function as a binder having adhesion, as well as the above function as the dispersant.

The dispersant contains a polar functional group, which enables interaction with the surface of the inorganic material to thus increase the dispersibility of the inorganic material. Also, the properties of the dispersant may be easily controlled, and it is possible to improve the dispersibility and the adhesion in a balanced manner, thereby contributing to the stability of a separator including the dispersant and an electrochemical device using the separator.

The acrylic copolymer may be a copolymer containing at least one functional group selected from the group consisting of an OH group, a COOH group, a CN group, an amine group, and an amide group.

The acrylic copolymer may be a copolymer containing at least one first functional group and at least one second functional group. Here, the first functional group may be selected from the group consisting of an OH group and a COOH group, and the second functional group may be selected from the group consisting of an amine group and an amide group. Here, when the polymer containing an OH group or a COOH group is used alone, adhesion may be enhanced but dispersibility is deteriorated and uniform coating does not occur. On the other hand, when the polymer containing an amine group and/or an amide group is used alone, dispersibility may increase but adhesion to a porous separator substrate may decrease. Thus, when the copolymer containing both at least one first functional group selected from the group consisting of an OH group and a COOH group and at least one second functional group selected from the group consisting of an amine group and an amide group is used, it is possible to realize uniform coating that improves both adhesion and dispersibility in a balanced manner, thereby preventing the coating layer from being stripped and providing electrochemical stability.

The acrylic copolymer may have a repeating unit derived from a monomer having the first functional group and a repeating unit derived from a monomer having the second functional group.

Non-limiting examples of the monomer having the first functional group may include at least one selected from the group consisting of (meth)acrylic acid, 2-(meth)acryloyloxy acetic acid, 3-(meth)acryloyloxy propyl acid, 4-(meth)acryloyloxy butyl acid, acrylic acid dimer, itaconic acid, maleic acid, maleic anhydride, 2-hydroxyethyl (meth)acrylate, 2-hydroxypropyl (meth)acrylate, 4-hydroxybutyl (meth) acrylate, 6-hydroxyhexyl (meth)acrylate, 8-hydroxyoctyl (meth)acrylate, 2-hydroxyethyleneglycol (meth)acrylate, and 2-hydroxypropyleneglycol (meth)acrylate.

The monomer having the second functional group may include those containing at least one of an amine group and an amide group at the side chain thereof, non-limiting examples of which may include at least one selected from the group consisting of 2-(((butoxyamino)carbonyl)oxy) ethyl(meth)acrylate, 2-(diethylamino)ethyl(meth)acrylate, (dimethylamino)ethyl(meth)acrylate, 3-(diethylamino)propyl(meth)acrylate, 3-(dimethylamino)propyl(meth)acrylate, methyl 2-acetoamido(meth)acrylate, 2-(meth)acrylamido-glycolic acid, 2-(meth)acrylamido-2-methyl-1-propane sulfonic acid, (3-(meth)acrylamidopropyl)trimethyl ammonium chloride, N-(meth)acryloylamido-ethoxyethanol, 3-(meth)acryloyl amino-1-propanol, N-(butoxymethyl) (meth)acrylamide, N-tert-butyl(meth)acrylamide, diacetone (meth)acrylamide, N,N-dimethyl(meth)acrylamide, N-(isobutoxymethyl)acrylamide, N-(isopropyl)(meth)acrylamide, (meth)acrylamide, N-phenyl(meth)acrylamide, N-(tris(hydroxymethyl)methyl)(meth)acrylamide, N—N'-(1,3-phenylene)dimaleimide, N—N'-(1,4-phenylene)dimaleimide, N—N'-(1,2-dihydroxyethylene)bisacrylamide, N—N'-ethylenebis(meth)acrylamide, and N-vinylpyrrolidinone.

Examples of the acrylic copolymer may include, but are not limited to, at least one selected from the group consisting of an ethyl acrylate-acrylic acid-N,N-dimethylacrylamide copolymer, an ethyl acrylate-acrylic acid-2-(dimethylamino) ethyl acrylate copolymer, an ethyl acrylate-acrylic acid-N,N-diethylacrylamide copolymer, and an ethyl acrylate-acrylic acid-2-(diethylamino)ethyl acrylate copolymer.

The amount of the dispersant may fall in the range of 0.5 to 5 parts by weight based on 100 parts by weight of the inorganic particles.

5) Binder

The binder includes a binder B and a binder A, and both the binder B and the binder A contain a vinylidene fluoride (VDF)-derived unit and a hexafluoropropylene (HFP)-derived unit. The HFP-derived unit constitutes 8 to 50 wt %, preferably 8 to 40 wt %, more preferably 8 to 30 wt %, much more preferably 8 to 20 wt %, and even more preferably 10 to 15 wt % of the binder B, and constitutes 5 wt % or more of the binder A under the condition that a proportion of the HFP-derived unit in the binder A is 80% or less of a proportion of the HFP-derived unit in the binder B. The total number average molecular weight of the binder B falls in the range of 2 hundred thousand to 2 million, preferably 3 hundred thousand to 1.5 million, more preferably 4 hundred thousand to 1.2 million, and much more preferably 5 hundred thousand to 1 million, and the total number average molecular weight of the binder A is 70% or less of that of the binder B, and the weight ratio of binder A:binder B in the coating composition falls in the range of 0.1 to 10:1, preferably 0.3 to 8:1, more preferably 0.5 to 6:1, much more preferably 0.7 to 4:1, and even more preferably 0.8 to 2:1. If the amount of the binder A is less than the above lower limit, sufficient electrode adhesion cannot be realized due to drying before phase separation. On the other hand, if the amount of the binder A exceeds the above upper limit, the electrical resistance to the electrode is high or the adhesion deteriorates drastically at a thin coating thickness of 3 μm.

In addition to the binder B and the binder A, an additional binder may be used, and examples thereof may include vinylidene fluoride-derived copolymers including poly(vinylidene fluoride-co-chlorotrifluoroethylene), poly(vinylidene fluoride-co-trifluoroethylene), etc., polymethyl methacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, an acrylonitrile-styrene-butadiene copolymer, and polyimide, which may be used alone or in combinations of two or more thereof.

The amount of the binder may fall in the range of 3 to 50 parts by weight based on 100 parts by weight of the inorganic particles.

6) Coating Method

The coating method using the coating composition according to the present invention includes the steps of forming a binder solution, forming a coating slurry, and forming a porous coating layer.

In the step of forming the porous coating layer, the slurry obtained in the step of forming the coating slurry is applied on at least one surface of the porous substrate, thus forming a porous coating layer.

A description of the porous substrate remains the same as in the separator described above.

The method of applying the slurry containing inorganic particles dispersed therein on the porous substrate may include a typical coating process that is known in the art, examples of which may include dip coating, die coating, roll coating, comma coating, and mixtures thereof. Also, the porous coating layer may be selectively formed on only one surface or both surfaces of the porous substrate.

The coating process is preferably performed at predetermined humidity. After coating with the slurry, drying is conducted, whereby the binder A and the binder B according to the present invention dissolved in the coating layer (slurry) have different phase transition properties based on a vapor-induced phase separation phenomenon known in the art. Generally, the phase transition rate by a non-solvent (for example, water or vapor) decreases the phase separation rate in the presence of the same non-solvent with an increase in HFP content, and the amount of the non-solvent necessary for phase separation is relatively increased. Thereby, the binder A, having low HFP content, undergoes phase transition due to a relatively small amount of non-solvent and has a high phase transition rate, and thus the binder A is distributed in a large amount on the surface of the resultant porous coating layer compared to the binder B, ultimately forming the structure of the adhesive layer. On the other hand, the binder B, having relatively high HFP content, requires a large amount of non-solvent for phase separation, and has a relatively low phase separation rate, and thus is present in a large amount in the porous coating layer compared to the binder A. Thus, according to an embodiment of the present invention, a structurally stable porous coating layer is formed, and a binder layer having high adhesion to the electrode is formed on the porous coating layer. When the weight proportion of HFP in the binder A is 80% or less of that of the binder B, desired distribution tendency of the binder as described above may be exhibited.

However, the desired purpose cannot be achieved based only on the difference in the HFP content under conditions of a thin film of 3 μm or less and low humidity. Since the number average molecular weight of the binder A having low HFP content in the binder according to the present invention is lower than that of the binder B, phase transition may occur rapidly, even in the short drying time of the thin-film coating of 3 μm or less, and may be carried out at a higher rate. When the number average molecular weight of the binder A is 70% or less of that of the binder B, desired properties may be obtained even under conditions of thin-film coating of 3 μm or less and low humidity.

The drying may be performed by any process known in the art, and may be carried out batchwise or continuously using an oven or a heating chamber in a temperature range set in consideration of the vapor pressure of the solvent used. The drying removes almost all of the solvent present in the M slurry, and is preferably conducted as quickly as possible in consideration of productivity, etc. For example, drying may be carried out for 1 min or less, preferably 30 sec or less.

Thus, the separator of the present invention manufactured by the above manufacturing method may be used as a separator of an electrochemical device.

Specifically, the separator according to an embodiment of the present invention may be efficiently used as a separator interposed between a cathode and an anode.

7) Electrochemical Device

An electrochemical device includes all devices that perform an electrochemical reaction. Specific examples of the electrochemical device may include all kinds of primary batteries, secondary batteries, fuel cells, solar cells, and capacitors such as supercapacitor devices. Particularly, among the secondary batteries, a lithium secondary battery including a lithium metal secondary battery, a lithium ion secondary battery, a lithium polymer secondary battery or a lithium ion polymer secondary battery is preferable.

The electrochemical device may be manufactured through a method typically known in the art. For example, the electrochemical device may be manufactured by assembling the cathode and the anode with the separator interposed therebetween and then injecting the electrolyte solution.

The electrode to be applied together with the separator according to an embodiment of the present invention is not particularly limited, and may be manufactured in a manner in which an electrode active material is bound to an electrode current collector using a method typically known in the art. Non-limiting examples of the cathode active material of the electrode active material include a typical cathode active material used for a cathode of an electrochemical device, and particularly, lithium manganese oxide, lithium cobalt oxide, lithium nickel oxide, lithium iron oxide, or lithium composite oxide, as a combination thereof, is preferably used. Non-limiting examples of the anode active material may include a typical anode active material used for an anode of an electrochemical device, and particularly useful is a lithium adsorption material, such as lithium metal or lithium alloy, carbon, petroleum coke, activated carbon, graphite or other carbonaceous materials. Non-limiting examples of the cathode current collector include a foil made of aluminum, nickel or a combination thereof, and non-limiting examples of the anode current collector include a foil made of copper, gold, nickel, a copper alloy or a combination thereof.

The electrolyte solution that may be used in an embodiment of the present invention may include, but is not limited to, those obtained by dissolving or dissociating a salt having a structure of $A^+B^-$, in which $A^+$ includes alkali metal cations such as $Li^+$, $Na^+$, $K^+$ or combinations thereof, and $B^-$ includes anions such as $\mu F_6^-$, $BF_4^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or combinations thereof, in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a mixture thereof.

The electrolyte solution may be injected at an appropriate step during the battery manufacturing process, depending on the manufacturing process of a final product and the properties required thereof.

EXAMPLES

A better understanding of the present invention will be given through the following examples and test examples, which are not to be construed as limiting the present invention. The embodiments of the present invention may be modified in a variety of different forms, and the scope of the present invention should not be construed as being limited to the following examples, which are merely provided to fully explain the present invention to those of ordinary skill in the art.

1) Preparation of Binder

The binder solutions of Example according to the present invention and Comparative Examples 1 and 2 were prepared as follows.

<Binder of Example>
Binder A: PVDF-HFP, molecular weight of 4 hundred thousand, HFP content of 8%
Binder B: PVDF-HFP, molecular weight of 9 hundred thousand, HFP content of 14%
Mixing weight ratio of binder A and binder B at 1:1
<Binder of Comparative Example 1>
Use of only binder A of Example
<Binder of Comparative Example 2>
Use of only binder B of Example 2) Preparation of Coating Layer
<Comparison of Coating Results>

A binder solution was prepared in a manner in which the binder A and the binder B were mixed at a weight ratio of 1:1, added to acetone, and dissolved at 50° C. for about 4 hr. As an inorganic material, $Al_2O_3$ powder having a size of 500 nm and $Al_2O_3$ powder having a size of 250 nm were mixed at a weight ratio of 9:1 and then added to the binder solution such that the weight ratio of polymer binder:total inorganic particles was 1:4. Cyanoethyl polyvinyl alcohol was added in an amount of 10 wt % based on the total amount of PVDF-HFP binder, followed by a ball-milling process for a total of 12 hr, whereby the inorganic particles were pulverized and dispersed, thus preparing a slurry. Here, the ratio of solvent to solid was 4:1.

The slurries of Comparative Examples 1 and 2 were prepared as above, with the exception that a different binder was used.

Figure 3:
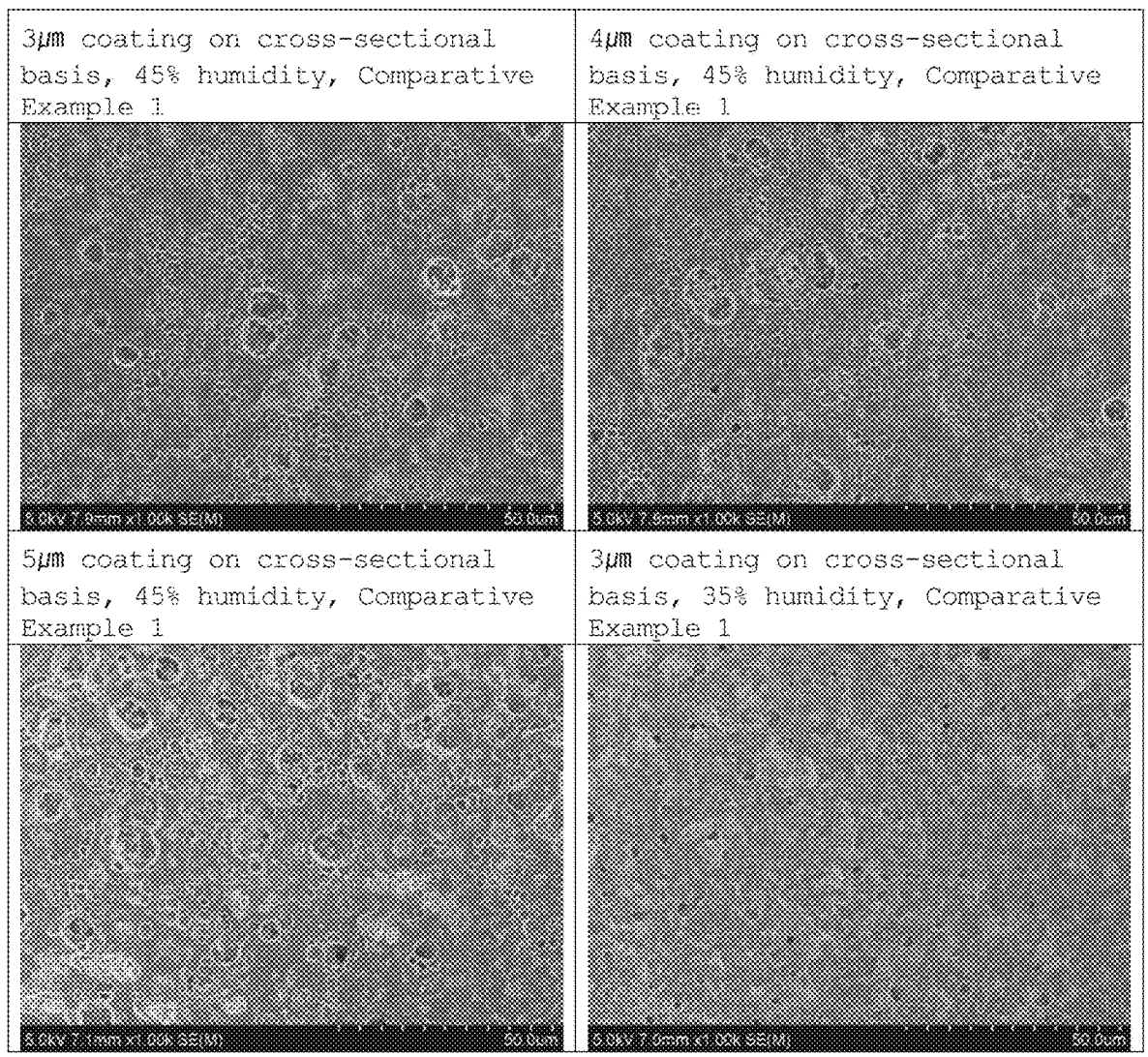
FIG. 3 shows electron microscope images of Comparative Example 1 according to the present invention.

The slurries using the binders of Example and Comparative Examples 1 and 2 were applied to thicknesses of 3, 4, and 5 μm on a cross-sectional basis at a humidity of 45%, and additionally, 3 μm coating on a cross-sectional basis was performed at a humidity of 35%. The coating surfaces of Example and Comparative Examples 1 and 2 were observed using an electron microscope. The results are shown in FIGS. 2, 3 and 4. Good coating was realized only in FIG. 2, even under conditions of 3 μm and 35% humidity, and Comparative Example 2 did not exhibit satisfactory coating results under any conditions.

The electrodes were manufactured using the coating compositions of Example and Comparative Examples 1 and 2, and were then measured for ER (resistance, ohms), electrode-separator adhesion (gf/15 mm), and peel strength (gf/15 mm). Only in Example 1, similar properties were exhibited under low humidity and 3 μm thin-film coating, and adhesion was drastically deteriorated in Comparative Examples 1 and 2. Particularly in Comparative Example 2, adhesion was very low, and was further reduced upon thin-film coating.

TABLE 1

| Conditions | | | Example | | | Comparative Example 1 | | | Comparative Example 2 | | |
| --- | --- | --- | --- | --- | --- | --- | --- | --- | --- | --- | --- |
| Humidity (%) | Coating thick. (μm) | ER (Ohm) | Electrode-separator adhesion (gf/15 mm) | Peel strength (gf/15 mm) | | ER (Ohm) | Electrode-separator adhesion (gf/15 mm) | Peel strength (gf/15 mm) | ER (Ohm) | Electrode-separator adhesion (gf/15 mm) | Peel strength (gf/15 mm) |
| 45 | 3 | 0.85 | 60 | 153 | | 1.14 | 52 | 75 | 0.83 | 21 | 235 |
| 45 | 4 | 0.92 | 68 | 107 | | 1.18 | 57 | 89 | 0.86 | 27 | 204 |
| 45 | 5 | 0.94 | 75 | 141 | | 1.26 | 72 | 83 | 0.85 | 41 | 216 |
| 35 | 3 | 0.85 | 53 | 164 | | 1.05 | 7 | 95 | 0.82 | 15 | 415 |

As described above, it can be confirmed that superior properties were exhibited even under conditions of low humidity and thin-film coating only in Example of the present invention.

INDUSTRIAL APPLICABILITY

The present invention can provide a coating composition, including a binder that reinforces the safety due to the strong integration of the separator and the electrode by increasing the bondability between the porous coating layer of the separator and the electrode, suppresses the increase in the interfacial resistance of the separator and the electrode due to electrode side-reactions occurring during a cycle, and improves air permeability. Upon thin-film coating from 4 μm to 3 μm, the coating composition of the invention can solve problems in which sufficient electrode adhesion cannot be obtained due to drying of the binder before sufficient phase separation, and enables sufficient phase separation even at low humidity of the manufacturing method.

The invention claimed is:

1. A coating composition, comprising:
a solvent, inorganic particles, a dispersant, and a binder, wherein the binder comprises a binder B and a binder A,
both the binder B and the binder A comprise a vinylidene fluoride (VDF)-derived unit and a hexafluoropropylene (HFP)-derived unit,
binder B comprises 8 to 50 wt % of the HFP-derived unit, and binder A comprises 5 wt % or more of the HFP-derived unit under a condition that a proportion of the HFP-derived unit in the binder A is 80% or less of a proportion of the HFP-derived unit in the binder B,
the binder B has a total number average molecular weight of 200,000 to 2,000,000 Da, and the binder A has a total number average molecular weight corresponding to 70% or less of that of the binder B, and
a weight ratio of the binder A:the binder B in the coating composition is 0.8 to 2:1,
said coating composition being suitable for use in coating at least one surface of a porous substrate having a plurality of pores to form a coating layer, and
wherein the coating layer has a thickness of 3 μm or less on a cross-sectional basis,
wherein a larger amount of binder A is distributed on a surface of the coating layer compared to an amount of binder B distributed on the surface of the coating layer, and a larger amount of binder B is distributed inside the coating layer compared to an amount of binder A distributed inside the coating layer.

2. The coating composition of claim 1, wherein the binder B and the binder A are a copolymer composed of vinylidene fluoride (VDF) and hexafluoropropylene (HFP).

3. The coating composition of claim 1, further comprising an additional binder, in addition to the binder B and the binder A, the additional binder comprising any one or a mixture of two or more selected from the group consisting of a vinylidene fluoride-derived copolymer, polymethyl methacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, an acrylonitrile-styrene-butadiene copolymer, and polyimide.

4. The coating composition of claim 1, wherein the porous substrate is a polymer film, a multilayer film thereof, a woven fabric, or a nonwoven fabric, which is formed of any one or a mixture of two or more selected from the group consisting of polyethylene, polypropylene, polyethylene terephthalate, polybutylene terephthalate, polyester, polyacetal, polyamide, polycarbonate, polyimide, polyetheretherketone, polyaryletherketone, polyetherimide, polyamideimide, polybenzimidazole, polyethersulfone, polyphenylene oxide, a cyclic olefin copolymer, polyphenylene sulfide, and polyethylene naphthalene.

5. The coating composition of claim 1, wherein the dispersant is any one or a mixture of two or more acrylic copolymer.

6. The coating composition of claim 1, wherein the inorganic particles are selected from the group consisting of inorganic particles having a dielectric constant of 5 or more, inorganic particles having lithium ion transfer capacity, and a mixture thereof.

7. The coating composition of claim 1, wherein the inorganic particles comprise at least two kinds of inorganic particles having different sizes.

8. The coating composition of claim 1, wherein the binder is present in an amount of 3 to 50 parts by weight based on 100 parts by weight of the inorganic particles.

9. The coating composition of claim 1, wherein the dispersant is present in an amount of 0.5 to 5 parts by weight based on 100 parts by weight of the inorganic particles.

10. A separator, comprising a coating layer formed through coating with the coating composition of claim 1.

11. An electrochemical device, comprising a cathode, an anode, and the separator of claim 10 interposed between the cathode and the anode.

12. The electrochemical device of claim 11, wherein the electrochemical device is a lithium secondary battery.

13. The coating composition of claim 3, wherein the additional binder comprises a vinylidene fluoride-derived copolymer selected from the group consisting of poly(vinylidene fluoride-co-chlorotrifluoroethylene) (PVDF-CTFE) and poly(vinylidene fluoride-co-trifluoroethylene) (PVDF-TFE).

* * * * *